United States Patent [19]
Baker et al.

[11] Patent Number: 5,642,456
[45] Date of Patent: Jun. 24, 1997

[54] LIGHT INTENSITY ATTENUATOR FOR OPTICAL TRANSMISSION SYSTEMS

[75] Inventors: Glenn Baker, Studio City; Douglas Brenner; Zafirios Gourgouliatos, both of Los Angeles; Kenneth Li, Arcadia, all of Calif.; Karlheinz Strobl, Southridge, Mass.

[73] Assignee: Cogent Light Technologies, Inc., Santa Clarita, Calif.

[21] Appl. No.: 121,164

[22] Filed: Sep. 14, 1993

(Under 37 CFR 1.47)

[51] Int. Cl.[6] .............................................. G02B 26/02
[52] U.S. Cl. ...................... 385/140; 385/902; 359/230; 359/234; 359/236; 359/894; 600/180; 600/181
[58] Field of Search ........................... 359/227, 230, 359/234, 235, 236, 232, 896, 118, 117, 559, 562, 577, 578, 739, 894; 385/115, 140, 902; 362/293, 323; 600/177, 180, 181; 348/45

[56] References Cited

U.S. PATENT DOCUMENTS

| | | | |
|---|---|---|---|
| 1,762,383 | 6/1930 | Booraem | 600/144 |
| 2,995,997 | 8/1961 | Nieuwenhoven | 359/739 |
| 3,195,405 | 7/1965 | Clark et al. | 385/140 |
| 3,891,968 | 6/1975 | McMahon | 359/559 |
| 4,086,605 | 4/1978 | Ishikawa et al. | 359/739 |
| 4,165,919 | 8/1979 | Little | 359/234 |

(List continued on next page.)

FOREIGN PATENT DOCUMENTS

| | | | |
|---|---|---|---|
| 0075945 | 7/1978 | Japan | 385/140 |
| 0064307 | 4/1985 | Japan | 385/140 |
| 401140114 | 6/1989 | Japan | 600/180 |
| 401200214 | 8/1989 | Japan | 600/180 |
| 401222213 | 9/1989 | Japan | 600/180 |
| 402285317 | 11/1990 | Japan | 600/180 |
| 0098008 | 4/1991 | Japan | 385/117 |
| 0225312 | 10/1991 | Japan | 385/140 |
| 0699470 | 11/1979 | U.S.S.R. | 359/739 |
| 0696402 | 11/1979 | U.S.S.R. | 359/739 |

OTHER PUBLICATIONS

S. Kawakami, et al., "Index Profiling Method for Preforms and Multimode Fibers", *Optics Letters*, vol. 9, No. 1, Jan. 1984, pp. 25–27.

*Primary Examiner*—Paul M. Dzierzynski
*Assistant Examiner*—John Juba, Jr.
*Attorney, Agent, or Firm*—Rothwell, Figg, Ernst & Kurz

[57] ABSTRACT

The present invention provides a variable attenuator for an optical transmission system having a disc-like masking plate with apertures (or image zones) formed in an arcuate control area at the periphery of the plate. Within each aperture, at least one opaque masking member is provided extending outward from the origin to the perimeter of the aperture and having a masking surface with an incremental masking area which continuously increases in magnitude with increasing radial length of the aperture. The perpendicular cross-section of each masking member with respect to the optical axis preferably forms a geometric shape having straight-line edges extending radially outward from the origin of the aperture. In the preferred embodiment, a plurality of masking members are utilized (as a pair or sets of pairs). The disc-like masking plate is inserted perpendicularly into the path of the light beam such that the optical axis of the light beam defines a movement axis about the periphery of the masking plate upon which the origin of each aperture is placed. In this manner, rotation of the masking plate around its center provides discrete levels of attenuation of the light beam as successive apertures are placed in the path of the light beam. Several alternate embodiment enable gradual adjustment of the level of attenuation using a plurality of masking plates each having a single aperture with at least one masking member disposed therein. In these embodiments, the masking plates are disposed perpendicularly at predetermined intervals along the optical axis of the light beam and are independently rotated about the optical axis so as to vary the total masked area of the light beam's spot image by overlapping of the masking members.

20 Claims, 5 Drawing Sheets

U.S. PATENT DOCUMENTS

| | | | |
|---|---|---|---|
| 4,233,650 | 11/1980 | Hagner et al. | 362/32 |
| 4,299,443 | 11/1981 | Minami et al. | 359/559 |
| 4,322,129 | 3/1982 | Takahashi et al. | 600/181 |
| 4,580,552 | 4/1986 | Nishioka et al. | 385/117 |
| 4,591,231 | 5/1986 | Kaiser et al. | 385/140 |
| 4,704,660 | 11/1987 | Robbins | 362/32 |
| 4,706,657 | 11/1987 | Miyagi | 128/6 |
| 4,737,622 | 4/1988 | Shishido et al. | 600/180 |
| 4,891,738 | 1/1990 | Richardson et al. | 362/282 |
| 5,006,965 | 4/1991 | Jones | 362/32 |
| 5,061,995 | 10/1991 | Lia et al. | 385/117 |
| 5,207,494 | 5/1993 | Jones | 363/323 |
| 5,329,435 | 7/1994 | McGuire | 359/888 |
| 5,367,444 | 11/1994 | Bornhorst et al. | 362/264 |
| 5,371,655 | 12/1994 | Murdock et al. | 359/888 |
| 5,416,875 | 5/1995 | Keplinger et al. | 385/102 |
| 5,436,655 | 7/1995 | Hiyama et al. | 348/45 |
| 5,459,602 | 10/1995 | Sampsell | 359/234 |

FIG. IA
PRIOR ART
FIG. IB
PRIOR ART
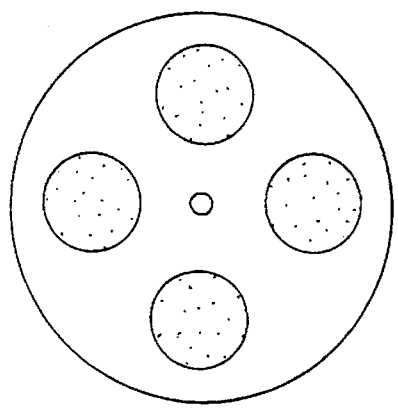
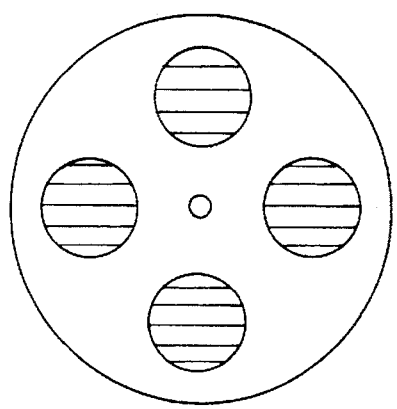
FIG. 2A
PRIOR ART
FIG. 2B
PRIOR ART
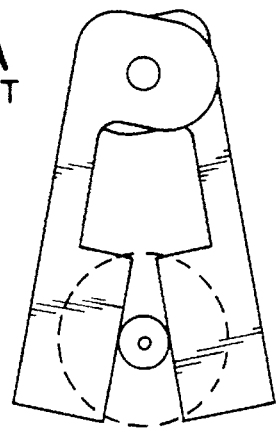
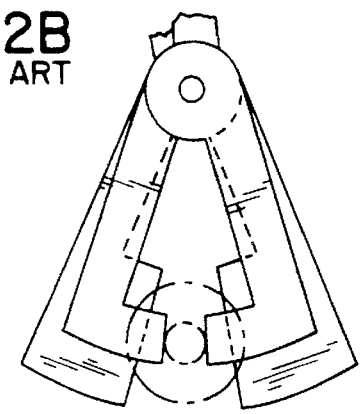
FIG. 3A
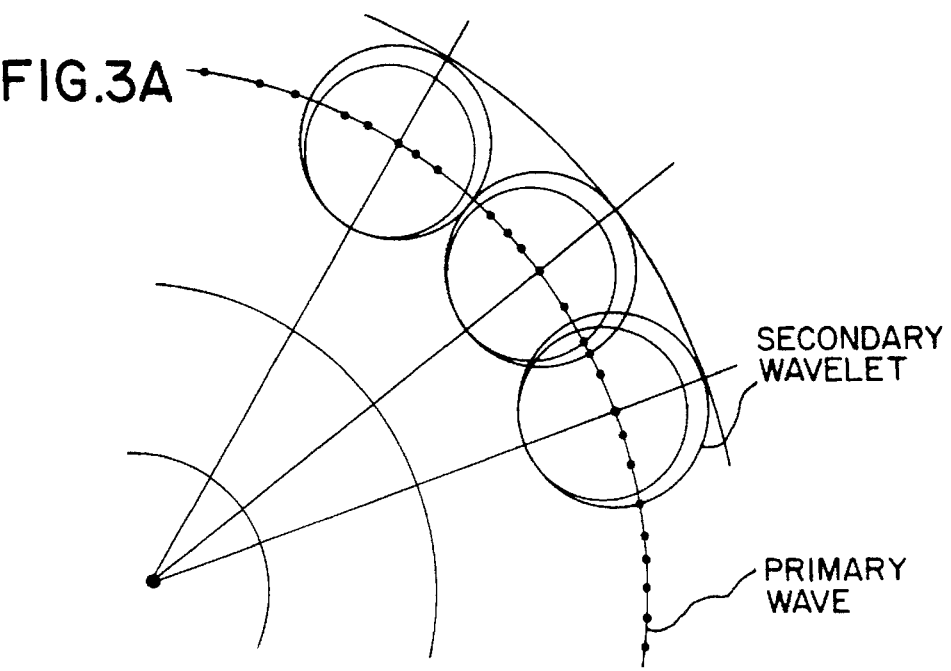
SECONDARY WAVELET
PRIMARY WAVE

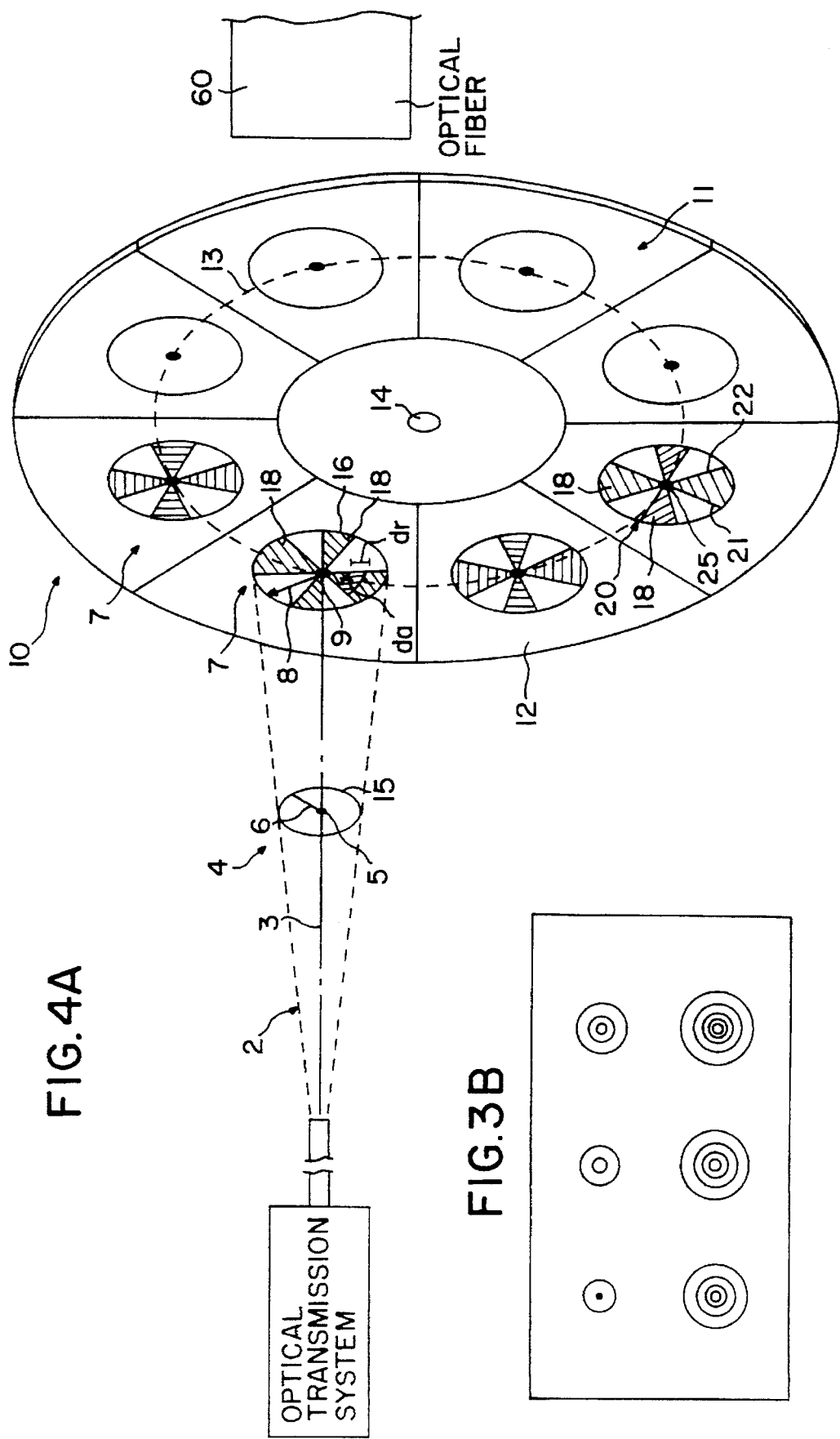

LIGHT INTENSITY ATTENUATOR FOR OPTICAL TRANSMISSION SYSTEMS

FIELD OF THE INVENTION

This invention relates to optical transmission systems, and more particularly, to the attenuation of the intensity of a light beam output from a fiber optic transmission system and the elimination of the ring-pattern intensity profile at the viewing area.

BACKGROUND OF THE INVENTION

In the field of fiber optic transmission systems, it is sometimes desirable to control in a uniform manner the attenuation of a light beam output from an optical fiber for application in such fields as endoscopy, boroscopy and the like where controlled illumination of a viewing area is critical. (For purposes of clarification, the term "light beam" is used throughout this document to denote a collection of not only paraxial or generally parallel light rays, but also non-parallel light rays such as those which form a cone of light emitted from optical fibers or modified by optical devices). Several different methods for attenuating the intensity of such an output light beam have been utilized in the past in a variety of fields. One of the fast methods utilized for controlling the intensity of light emitted by an optical transmission system was the use of a high intensity lamp in which the amount of light generated therefrom was controlled by regulating the power supplied to the lamp. However, this method posed several problems such as changing the color of the generated light and unsuccessful operation of the lamp at lower intensities.

Other methods for attenuating the intensity of an output light beam involve the use of masking devices ranging from screens to masking plates having "image zones" with a plurality of minute apertures or slots formed in the mask's surface within each image zone (see FIG. 1a and 1b) to scissor-like instruments having angularly adjustable shielding members adapted for insertion into the path of the light beam (see FIGS. 2a and 2b). However, such masking type attenuators are not suitable for applications which require controllable and uniform illumination of a viewing or working field. In the use of such masking devices, significant variations in light intensity across the cross-sectional area of the output light beam exist due to the occurrence of diffraction, selective excitation of modes in fibers and fiber bundles, and the subsequent mode mixing (or lack thereof) inside these fibers and fiber bundles. In addition, the attenuation of the light beam over its divergence angle is non-uniform, and will cause both ring patterns and changes in NA.

A common cause of non-uniformity is caused by Fresnel diffraction. Fresnel rings are generated by virtue of the fact that every point on the primary, spherical wave front acts as a continuous emitter of spherical secondary wavelets (as shown in FIG. 3a). As the secondary wavelets propagate from the surface of the spherical wave front incident upon the aperture, their positive and negative wave components superimpose to form a diffraction pattern consisting of a plurality of alternating bright and dark rings concentric about a central bright spot (see FIG. 3b). The number of rings formed in the diffraction pattern depends upon the size of the aperture through which the wave front passes and the separation distance between the aperture and the observation plate (or object of an optical system), while the light intensity of the (bright) rings decreases proportionately with their increasing radial displacement from the central bright spot. The occurrence of Fresnel rings produces extreme variations in the intensity of light across the cross-sectional area of the output light beam, thereby greatly diminishing the illuminating capability of the optical transmission system. Due to the other non-uniformity factors and imperfections, such extremes in intensity variations are rarely observed. It was found, however, that these rings could be eliminated through the use of Fresnel zone plates which comprise a series of opaque, concentric rings positioned in the path of the light beam so as to correspond to either the bright or dark rings of the resulting Fresnel diffraction pattern. In this manner, the Fresnel zone plate prevents the superposition of the negative and positive wave components in adjacent zones and produces an single, point spot of high irradiance. Nonetheless, such a zone plate cannot be adapted for attenuation of the output light beam since this would require varying the surface area of the opaque rings which cannot be done without destroying its ring-eliminating capability.

Accordingly, masking-type attenuators which comprise a plate having a plurality of randomly or uniformly disposed holes or slots have been used in an attempt to provide a means of attenuating the output light beam while minimizing the effects of the ring patterns (see FIG. 1a and 1b). However, these attenuators do not produce uniform illumination since they still permit the formation of at least the fast order bright ring (the ring of highest intensity) around the centrally disposed bright spot. This results from the fact that the use of discrete holes (or slots) in the masking plate causes a hole (or slot) or lack thereof to be positioned at the center of the light beam. This in turn establishes a discontinuity (in this case, at the center of the light beam) in the amount of attenuation per unit radius over the radial extent of a perpendicular cross-section of the light beam. (As will be further discussed below, this amount of attenuation should continuously increase with respect to increasing length of the radius for complete elimination of the rings). In a particular embodiment of the slotted-type attenuator, as shown in U.S. Pat. No. 5,006,965, a plurality of slots are formed in an arcuate portion of a masking device or vane which is inserted perpendicular to the optical axis of the light beam. Although this device provides a dynamic range in the attenuation of the output beam, it does not completely eliminate the ring patterns due to the above-described discontinuity caused by the presence of the rectangular slots which are not evenly disposed radially with respect to the optical axis.

As shown in FIGS. 2a and 2b, the scissor-like attenuators provide variable adjustment of the radiant energy reflected off their extended shielding members across the path of the light beam to create uniform brightness of an image being viewed. Attenuation of the output light beam over the cross-sectional area of the beam occurs so as to radiate the different surfaces of the object with more or less radiant energy. In the first case shown in FIG. 2a, a peripheral portion of the light beam can be attenuated independently of its central portion (but not vice versa) so as to illuminate the central portion of the viewing field primarily. In the second case shown in FIG. 2b, which device is the subject of U.S. Pat. No. 4,706,657, the attenuator comprises two pairs of extended shielding members which operate either independently of or in cooperation with each other so as to provide for adjustable variation in the illumination of the viewing field at either or both its central and peripheral regions. As is apparent from the construction of the shielding members and the manner in which they are inserted into the path of the light beam, a plurality of rings patterns are likely to result again due to the discontinuity in the required radially increasing amount of attenuation over the radial extent of the light beam's cross-sectional area.

Another type of attenuating device consists of an optical lens having its surface treated either to mask out potions of the light beam or diffuse the light rays of the light beam. In the first case, the surface of the lens is coated with an attenuating substance such as a nickel or chrome layer which is deposited with a variable thickness depending upon the amount of attenuation desired. In the second case, electron scattering of ions is utilized to form a myriad number of minute grooves or holes which act to diffuse the light rays passing therethrough. In each instance, however, the treatment method is very costly due to the techniques used and the uniformity that must be achieved. Additionally, each lens produces only one level of attenuation, therefore requiring a large number of treated lenses to enable variable adjustment of the light beam's intensity.

Accordingly, it is an object of the present invention to provide a relatively inexpensive and simple attenuator capable of varying, either discretely or gradually, the light intensity of a light beam output from an optical transmission system.

It is another object of the present invention to provide an attenuator which attenuates the light intensity of a light beam by providing at least one masking member having a geometric shape and disposition with respect to a cross-sectional image spot of the light beam which extends from a center point to a circumference of the spot image and provides an increasing amount of attenuation over the radial extent of the image spot's area. It is a further object of the present invention to provide a discretely variable attenuator having a disc-like masking plate with a plurality of apertures formed in an arcuate control area at a periphery of the masking plate, the apertures having an origin disposed on a movement axis of the masking plate coincident with the optical axis of the light beam and a varying number of masking members per aperture so as to permit selection of a particular aperture corresponding to a particular degree of attenuation.

It is yet another object of the present invention to provide a gradually variable attenuator comprising a plurality of masking members each having two edges intersecting at a corner point of the member coincident with the optical axis of the light beam, the masking members being disposed along the optical axis at predetermined intervals and being rotatable independent of one another to permit variable adjustment of the total masking area over the area of the cross-sectional spot image.

SUMMARY OF THE INVENTION

The present invention comprises a variable attenuator for an optical transmission system having a disc-like masking plate with apertures (or image zones) formed in an arcuate control area at the periphery of the plate. Each aperture includes an origin disposed in the center of the aperture and a radius with a radial length extending from the origin to a perimeter of the aperture. Within each aperture, at least one opaque masking member is provided extending outward from the origin to the perimeter of the aperture and having a masking surface with an incremental masking area which continuously increases in magnitude with increasing radial length of the aperture. The perpendicular cross-section of each masking member with respect to the optical axis preferably forms a geometric shape having straight-line edges extending radially outward from the origin of the aperture so as to preserve the numerical aperture of the resulting attenuated light beam. (However, curvilinear edges may be used when appropriate.) In the preferred embodiment, a plurality of masking members are utilized in each aperture having an axial symmetry about the optical axis of the light beam (i.e. the origin of the aperture). Preferably one to two pairs of masking members are used with the pairs being angularly separated from each other pair by the same predetermined angular extent.

The position of the disc-like masking plate is optimized by inserting it into the path of the light beam such that the optical axis of the light beam defines a movement axis, about the periphery of the masking plate, upon which the origin of each aperture is placed. In this manner, rotation of the masking plate around its center provides discrete levels of attenuation of the radiant energy in the light beam as successive apertures are placed in the path of the light beam.

Several alternate embodiments are also provided for enabling gradual adjustment of the level of attenuation using only a single aperture or a plurality of apertures each of which are disposed perpendicularly at predetermined intervals along the optical axis of the light beam. In one embodiment, each masking member within an aperture comprises a plurality of elongated segments rotatably coupled together about a pivot axis through the origin of the aperture for permitting angular displacement of the segments from a closed (stacked) position to an open (fan-like) position. In another embodiment, separate masking plates having only one aperture are provided and disposed perpendicularly along the optical axis of the light beam. The masking plates, which may form annular rings, have one or more masking members affixed therein and are independently rotated about the optical axis so as to vary the total masked area of light beam's spot image by overlapping of the members. In another embodiment, the masking members are arranged similar to the previous embodiment, but are held in place along the optical axis by means of a rotatable coupling between each masking member (or (a) pair(s) of masking members) and a shaft having a longitudinal axis coincident with the optical axis.

BRIEF DESCRIPTION OF THE DRAWINGS

FIG. 1a is a front plan view of a first prior art attenuator comprising a masking plate with a plurality of image zones each having a varying number of minute holes formed therein to provide a number of different and discrete levels of attenuation.

FIG. 1b is a front plan view of a second prior art attenuator comprising a masking plate with a plurality of image zones each having a varying number of minute, rectangular slots formed therein to provide a number of different and discrete levels of attenuation.

FIG. 2a is a front plan view of a first prior art, scissors-like attenuator having two, extended shielding members which rotate toward one another to gradually increase the level of attenuation in the light beam.

FIG. 2b is a front plan view of a second prior art, scissors-like attenuator having two pairs of extended shielding members which can be independently rotated into the path of the light beam to gradually decrease the level of attenuation in either or both of a peripheral and a central region of the light beam.

FIG. 3a is a schematic drawing of the propagation of a spherical wave, showing the formation of secondary wavelets from points located on a primary wave front FIG. 3b is a reproduction of a photograph showing the diffraction patterns for a spherical wave front incident upon circular apertures of increasing size and the Fresnel rings which result therefrom.

FIG. 4a is a perspective, schematic drawing of a disc-like masking plate being used as a discretely variable attenuator in a fiber optic transmission system, the masking plate having a plurality of apertures formed in an arcuate control area with a varying number of masking members per aperture to permit selection of a particular aperture corresponding to a particular degree of attenuation.

DETAILED DESCRIPTION OF THE INVENTION

Figure 4B:
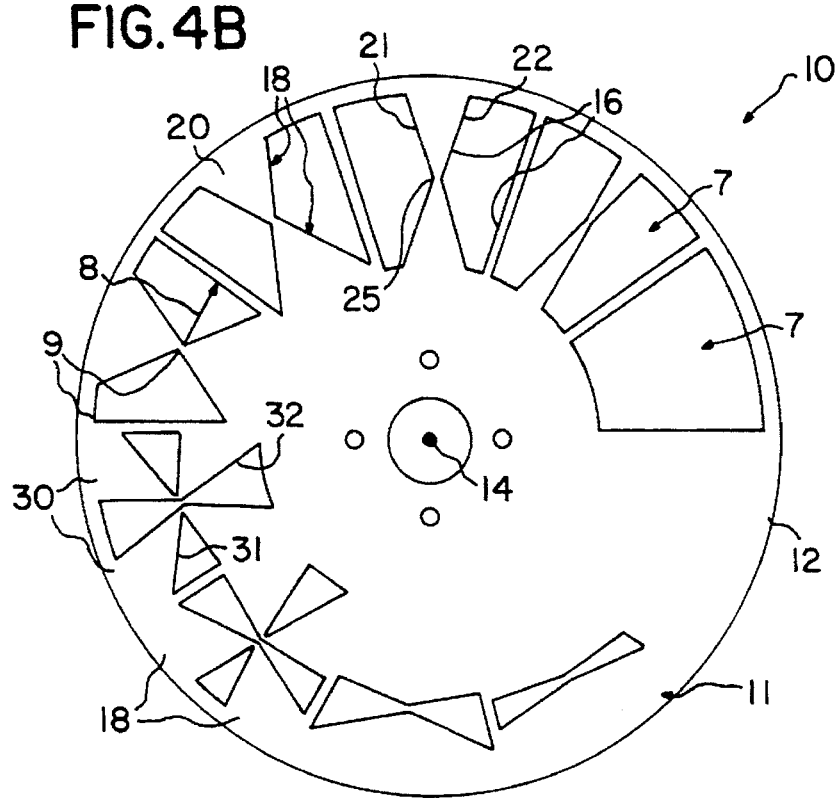
FIG. 4b is a front plan view of the preferred embodiment of the masking plate of the present invention.
Figure 5A:
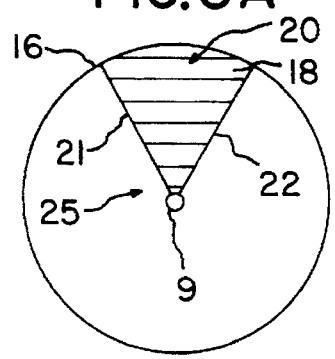
FIG. 5a is a front plan view of an aperture of a masking plate showing the implementation of a single masking member.
Figure 5B:
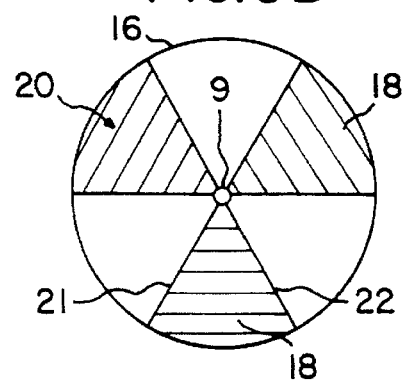
FIG. 5b is a front plan view of an aperture of a masking plate showing the implementation of a plurality of masking members.

In the following description, for purposes of explanation and not limitation, specific details are set forth, such as particular dimensions, numbers, optical components, etc. in order to provide a thorough understanding of the present invention. However, it will be apparent to one skilled in the art that the present invention may be practiced in other embodiments that depart from these specific details. In other instances, detailed descriptions of well-known elements, devices, characteristics and techniques are omitted so as not to obscure the description of the present invention with unnecessary details.

The present invention provides a light intensity attenuator for adjusting the quantity of radiant energy in a light beam 2 output from an optical transmission system as shown in FIG. 4a. (It is noted that the term "light beam" as used herein denotes a collection of not only paraxial or generally parallel light rays, but also non-parallel light rays such as those which form a cone of light that is produced at the output end of an optical fiber or produced by optical devices which modify the output light beam). The light beam 2 can be defined as having a cross-section perpendicular to an optical axis 3 of the light beam 2 which forms a substantially circular spot image 4 having a center point 5 coincident with the optical axis 3 and a radius 6 having a radial length extending from the center point 5 to a perimeter 15 of the spot image 4.

In the prior art, masking devices such as that shown in FIGS. 1a and 1b generally consist of a masking plate having either a random or uniform arrangement of holes or slots formed within a plurality of image zones of the plate. The masking plate is disposed in the path of the light beam such that the beam's circular spot image is incident upon one of the image zones and the masking surfaces thereof act to shield a quantity of light from the beam to produce an attenuated light beam. However, the problem with conventional masking devices is that they fail to provide a masking surface of the image zone having a continuous geometric shape with an increasing amount of attenuation over the radial extent of the image spot's area. In particular, it was found by the inventors that a critical element in the solution to eliminating the ring patterns is that the overall diffraction pattern (imaged in the spot-image incident upon a particular image zone) must be variably attenuated (in terms of magnitude) over the extent of its area. That is, each ring in the pattern must be attenuated to a degree proportional to its radial displacement from the center point of the spot image, although this proportionality need not be linear. This configuration is required for the fiber optic output for a number of reasons: (i) intensity distribution over the angular extent (NA) is non-uniform; (ii) diffraction is only one cause of the rings, (iii) light launched into relatively short (<3m) fiber is not scrambled by the mode structure of the fiber; and (iv) because the intensity distribution of light launched into the fiber is not uniform, various modes of the fiber are excited to different extents. Hence, the farther that a ring is displaced from the center point, a proportionately greater magnitude of attenuation for that portion of the spot image is required. The output optical fiber is illustrated in FIG. 4a and identified by reference numeral 60.

Additionally, it was determined that to eliminate all rings as completely as possible, the geometry of the masking area (apart from its magnitude) should be continuous over the radial extent of the spot image so as to avoid discontinuities in the diffraction of the negative and positive wave components forming the rings. In practical terms, this means that the masking surface for a particular spot image, which surface completely blocks out certain portions of the light beam, must dissect each and every concentric ring (including the centrally disposed bright point spot) by means of a geometric configuration that satisfies the above-described attenuation proportionality.

According to the preferred embodiment of the present invention as shown in FIGS. 4a and 4b, the attenuator comprises a disc-like masking plate 10 inserted into the light beam 2 at a desired angle to the optical axis 3 of the light beam 2. The disc-like plate 10 comprises a centrally disposed pivot axis 14 and an arcuate control area 12 extending along a periphery 11 of the masking plate 10 having a plurality of apertures (or image zones) 7 formed in the arcuate control area 12. Each aperture 7 includes an origin 9 which is disposed in the center of the aperture 7 and a radius 8 with a radial length extending from the origin 9 to a perimeter 16 of the aperture 7. So as to coincide the spot image 4 formed by the light beam 2 impinging upon the masking plate 10 and a selected one of the apertures 7 in the control area 12, the origin 9 of each aperture 7 is disposed on an arcuate movement axis 13 defining the path of intersection between the optical axis 3 of the light beam 2 and the masking plate 10 as the masking plate 10 is rotated about its pivot axis 14. In this manner, each aperture 7 provides a different, discrete level of attenuation of the radiant energy in the light beam 2 as the masking plate 10 is rotated about the pivot axis 14.

Figure 6A:
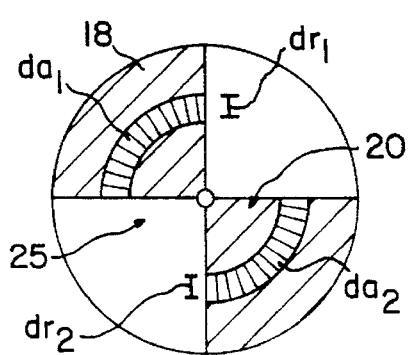
FIG. 6a is a front plan view of an aperture of a masking plate showing the implementation of a pair of masking members having geometric symmetry about the origin of the aperture.
Figure 6B:
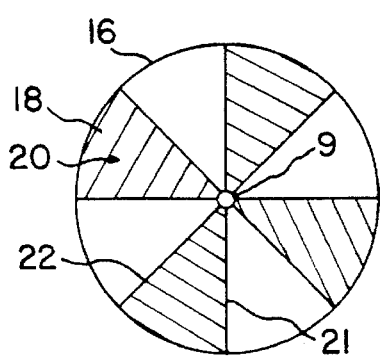
FIG. 6b is a front plan view of an aperture of a masking plate showing the implementation of two pairs of masking members.
Figure 7A:
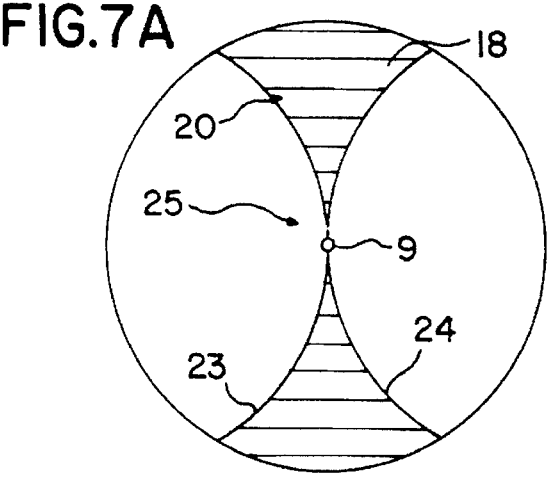
FIG. 7a is a front plan view of an aperture of a masking plate showing the implementation of a pair of masking members having a first alternate geometric shape which still maintains the continuity of increasing incremental masking area per unit radial length.
Figure 7B:
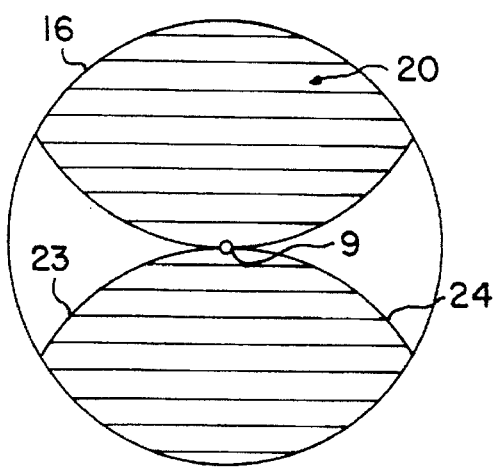
FIG. 7b is a front plan view of an aperture of a masking plate showing the implementation of a pair of masking members having a second alternate geometric shape which still maintains the continuity of increasing incremental masking area per unit radial length.
Figure 7C:
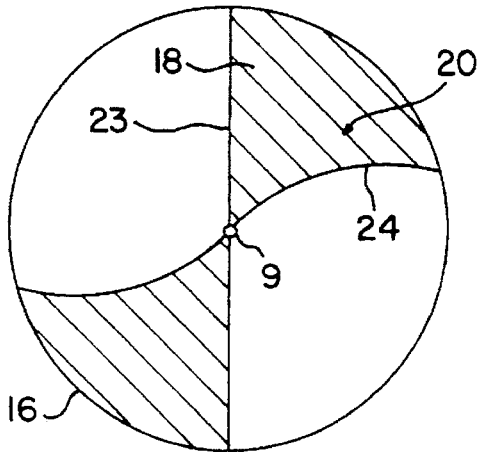
FIG. 7c is a front plan view of an aperture of a masking plate showing the implementation of a pair of masking members having a third alternate geometric shape which still maintains the continuity of increasing incremental masking area per unit radial length.

Within each aperture 7, a plurality of opaque masking members 18 are provided to prevent those portions of the light beam 2 incident upon the masking members 18 from passing through the aperture. As shown in FIGS. 5a, 5b, 6a, 6b, 7a, 7b, 7c, 8a and 8b, each masking member 18 extends outward from the origin 9 to the perimeter 16 of the aperture 7 and has a masking surface 20 with an incremental masking area da (as shown in FIG. 6a) which continuously increases in magnitude with increasing radial length r of the aperture 7. Hence, the above-described proportionality is maintained since the incremental area da of the masking surface 20 is continuously increased as the incremental area of the image spot 4 becomes larger with increasing radial length dr (see FIGS. 4a and 6a in particular). Similarly, the above-described continuous geometry is also maintained since the masking surface 20 of each masking member 18 begins as a point spot at the origin 9 of the aperture 7 and extends through the image spot 4 to the perimeter 16 of the aperture 7.

According to the preferred embodiment shown in FIGS. 4a and 4b, the masking member 18 has a cross-section perpendicular to the optical axis 3 of the light beam 2 which forms a shape having straight line edges 21,22 lying along radii 8 of the aperture 7, such as a triangle or a sector of a circle. This cross-sectional shape was adopted because it does not vary the numerical aperture of the resulting attenuated light beam, which in fiber optic terms, corresponds to the angular extent of the solid cone formed by the transmitted light beam. However, it would be obvious to one skilled in the art that other cross-sectional shapes having curvilinear edges 23,24, such as parabolic, hyperbolic, cycloidal shapes or combinations of these shapes (see FIGS. 7a, 7b and 7c), would be suitable for applications where the particular numerical ampere of the resulting light beam can be accommdated or is desired.

In addition, the preferred embodiment of the masking plate 10 (shown in FIG. 4b) further comprises masking members 18 having an axial symmetry about the optical axis 3 of the light beam 2. The reason for this axial symmetry is that (pursuant to the required radial geometry) the corner point 25 of each masking member 18 should be precisely located at the center point 5 of the spot image 4 to avoid the above-described discontinuity. Otherwise, a single Fresnel ring will appear in the resulting attenuated spot image as is the case in the prior art configurations shown in FIGS. 1a, 1b, 2a and 2b. In practice, however, such precise alignment is difficult to achieve but can be compensated for by arranging the masking members 18 in pairs 30 which are symmetric about the origin 9 of the aperture 7 (see FIGS. 6a, 6b, 7a, 7b and 7c). In this manner, each pair 30 forms a first masking member 31 disposed opposite to a second masking member 32 with respect to the origin 9 of the aperture 7.

Furthermore, it is preferable that each pair 30 of masking members 18 within each aperture 7 be angularly separated from each other pair by the same predetermined angular extent a and that the masking surfaces 20 of a particular pair 30 also have the same angular extent a as those of the other pairs 30 although this need not be the case. It is also noted that as the number of pairs 30 of symmetric masking members 18 present in a particular configuration increases, the criticality of the alignment of the mask with respect to the aperture 7 is reduced accordingly. Therefore, it would be advantageous to provide an attenuator as described above in which each aperture 7 has a maximum number of manufacturable masking members 18, with the level of attenuation being adjustable from aperture 7 to aperture 7 by varying the magnitude of the masking surfaces 20 of the masking members 18 between the different apertures 7.

Figure 8A:
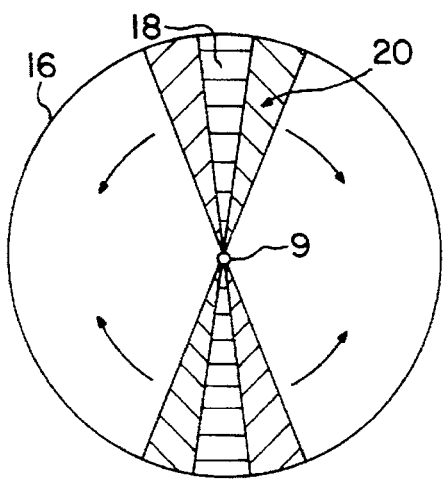
FIG. 8a is a front plan view of an aperture of a masking plate showing the implementation of a pair of masking members comprising a plurality of elongated segments (in the closed position) which can be spread open to permit gradual adjustment of the level of attenuation.
Figure 8B:
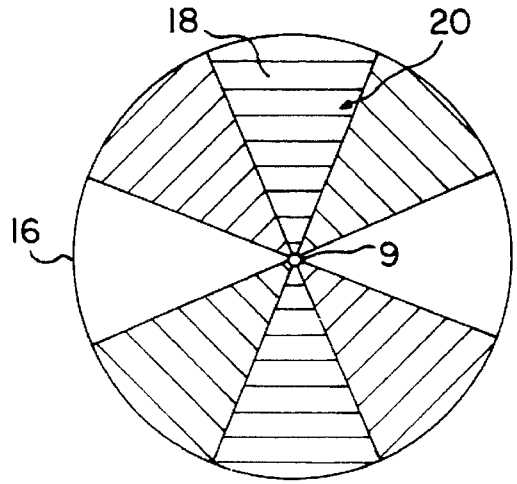
FIG. 8b is a front plan view of the masking members of FIG. 8a with the elongated segments in the open, fan-like arrangement.

Alternatively, in order to provide a gradual adjustment of the level of attenuation using only a single aperture 7, it is foreseeable that each masking member 18 may comprise a plurality of elongated segments 35 as shown in FIGS. 8a and 8b. These segments 35 would then be rotatable about a pivot axis passing through the same end of each segment 35 and through the origin 9 of the aperture 7 so as to permit rotation of the plurality of segments 35 from a stacked arrangement to a fan-like arrangement With such a configuration, the level of attenuation can be gradually controlled by angularly displacing the segments 35 of the masking members 18 toward either an open position where the level of attenuation is increased or a dosed position where the level of attenuation is decreased.

With respect to the construction of the masking plate 10 shown in FIG. 4b, the plate 10 is preferably manufactured from a copper alloy (i.e. brass) and is subsequently nickel plated through an electroless process (i.e. by chemical deposition of the nickel). Alternatively, other metals and materials may be used as long as they have sufficient thermal conductivity to protect the plate 10 from damage which might otherwise result from the high intensity light beam being used. The masking plate 10 is then etched in an etching solution in order to form the desired patterns of the masking members 18 and the apertures 7. This is accomplished by placing a patterned sheet of an etch-resistant material (i.e. a photoresist) corresponding to the masking members 18 (and the other solid portions of the plate 10) on top of the plate 10 to protect it from the etchant. The plate 10 is then placed in the etchant until the unprotected areas are etched clean through. The pattern is then removed from the plate 10.

In terms of the over-all configuration of the optical system of the present invention (shown in FIG. 4a), the attenuator is preferably utilized in a fiber optic transmission system in which the light beam 12 forms a conical beam and the image spot 4 formed therefrom at the masking plate 10 comprises a radius 6 having a length not greater than the radial length of the aperture 7. Similarly, the light beam 2 preferably comprises incoherent light although the source from which it is optically coupled through fiber optics, may also comprise coherent light or monochromatic light. The fiber optic transmitting the light is not restricted either in diameter or numerical aperture; however, the image spot 4 will vary depending on the collecting and condensing optics, thus requiring that the radial length of the aperture 7 be chosen so as to equal or exceed the radius 6 of image spot 4. This requirement must be satisfied independent of the source of light coupled to the fiber to achieve optimization although smaller radial lengths of the aperture 7 can be used but with varied results.

Figure 9:
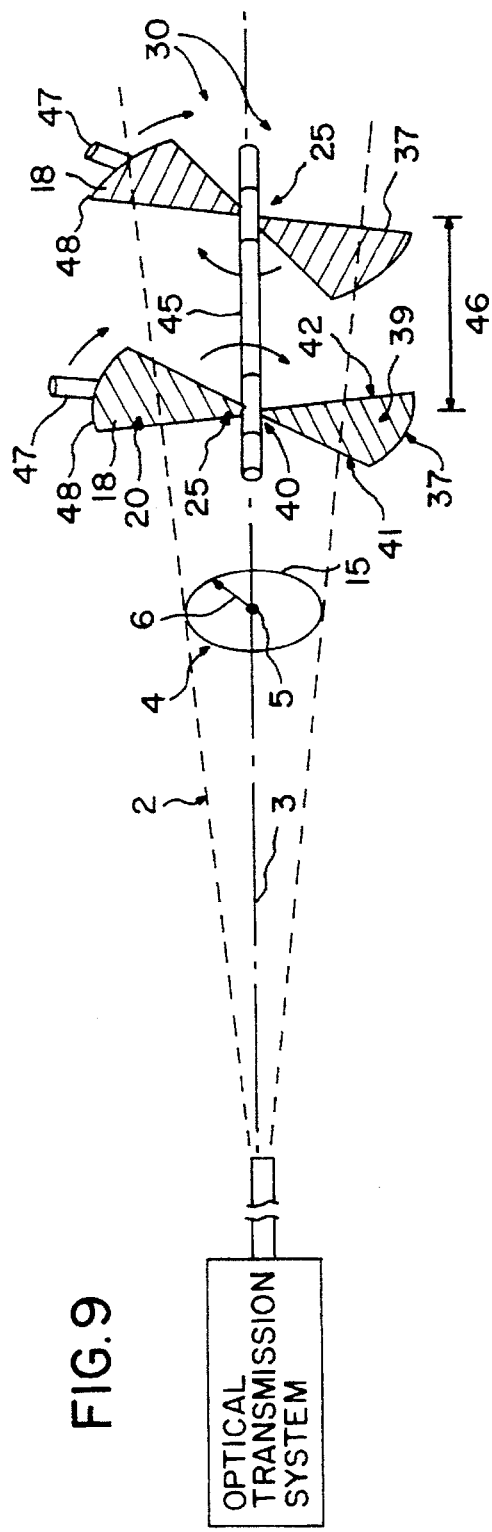
FIG. 9 is an alternate embodiment of the present invention showing a plurality of masking members rotatably coupled at predetermined intervals along a shaft coincident with the optical axis, the masking members being rotatable independent of one another to permit variable adjustment of the total masking area over the area of the cross-sectional spot image.
Figure 10:
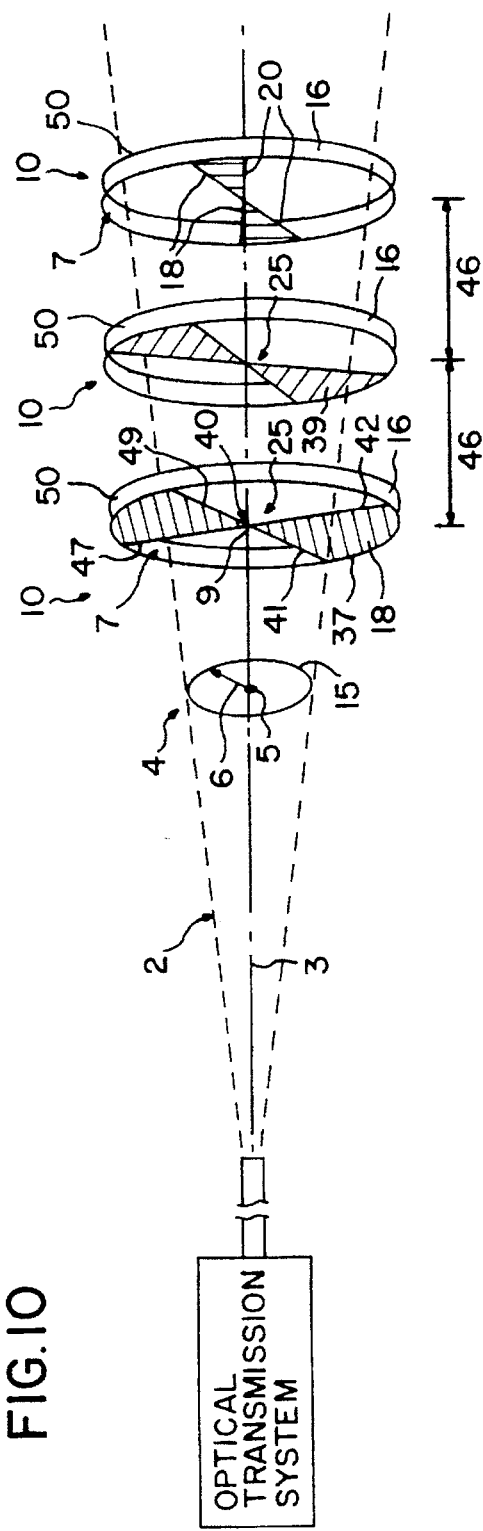
FIG. 10 is an alternate embodiment of the present invention showing a plurality of masking members affixed to the inner circumference of a number of annular rings disposed along the optical axis at predetermined intervals, the rings being rotatable independent of one another to permit variable adjustment of the total masking area over the area of the cross-sectional spot image.

According to an alternate embodiment shown in (FIGS. 9 and 10), the present invention is modified so as to provide an attenuator in which the magnitude of attenuation can be gradually adjusted by overlapping of the masking members 18 through independent rotation of the members 18 about the optical axis 3 of the light beam 2. In this embodiment each masking member 18 comprises a distal end 37 having a perpendicular cross-section 39 with respect to the optical axis 3, the cross-section 39 being defined by the intersection of two edges 41,42 at a corner point 40 coincident with the center point 5 of the spot image 4. In order to provide a continuous geometry over the radial extent of the spot image 4 suitable for overlapping, the first and second edges 41,42 of the cross-section 39 comprise straight-line edges having radial lengths equal to or larger than the radial length of the spot image 4. Depending upon the total number of masking members 18 utilized, the edges 41,42 of each masking member will intersect at an angle comprising either an acute angle, a right angle or an obtuse angle.

Pursuant to one configuration, the masking members 18, which have triangular or sectorial cross-sections 39 (with a third, outer edge) and which may be combined into pairs 30 or sets of pairs as described above, are held in place by the disposition of a single shaft 45 centered on the optical axis 3. The corner point 25 of each masking member 18 is then rotatably coupled to the shaft 45 at predetermined intervals 46 along the optical axis 3. The shaft 45 should have a diameter as small as possible so as to minimize the blockage of light at the center point 5 of the image spot 4. A pivot rod 47 may be affixed to the outer edge 48 of the masking members 18 in a radial disposition to the optical axis 3 for use in rotating the masking members 18 or pairs 30 of masking members 18. The pivot reds 47 are then independently moved about the optical axis 3 so as to adjust the radial disposition of the masking members 18 from a closed, overlapping (or stacked) arrangement where the amount of attenuation is minimized to an open, non-overlapping (or fan-like) arrangement where the amount of attenuation is maximized.

In another configuration, the invention comprises a plurality of masking plates 10 having substantially planar masking surfaces 20 disposed proximate to one another at the previously defined intervals 46 along the optical axis. An aperture 7 is formed in each masking plate 10, the extent of the aperture 7 being defined by a perimeter 16 in the masking plate 10 at which point a proximate end 49 of at least one masking member 18 is affixed to the plate 10. With such a configuration, the aperture 7 of each masking plate 10 has an origin 9 placed substantially in the center of the aperture 7 which origin 9 is coincident with both the optical axis 3 of the light beam 2 and the corner point 25 of the masking members 18. In this manner, the entire masking plate 10 can be rotated about the optical axis 3 so that masking surfaces 20 of the masking members 18 can be overlapped to provide a gradually adjustable attenuation of the light beam 2. In a more specific configuration, each masking plate 10 forms an annular ring 50 with the perimeter 16 of the aperture 7 forming the inner circumference of the ring 50 to which the proximate end 49 of the masking members 18 can be affixed. With the use of annular rings 50 as the masking plates 10, it is preferred that the radius of each ring 50 be of a length not less than the radial length of the spot image 4 so as to avoid interference of the ring 50 with the spot image 4.

It will be recognized that the above described invention may be embodied in other specific arrangements with a variety of housings and may include the use of other types of masking plates 10 and masking members 18 (having the characteristics described above) without departing from the spirit or essential elements of this disclosure. Thus, it is understood that the invention is not to be limited by the foregoing illustrative details, but rather is to be defined by the appended claims.

We claim:

1. An optical system comprising:

a light source for providing a light beam, the light beam having a cross-section perpendicular to an optical axis of the light beam defining a spot having a center point coincident with the optical axis of the light beam, said spot having a radial distribution of light intensity from said center point;

a single optical fiber having an entrance aperture positioned for receiving the light beam; and a light intensity attenuator, positioned between the source and the single optical fiber, for adjusting a quantity of radiant energy in the light beam, the attenuator including a rotatable masking plate with at least two apertures, each of said aperture having an origin disposed substantially in a center of the aperture and a radius with radial length extending from the origin to a perimeter of the aperture, said plate being positioned in the light beam substantially perpendicular to the optical axis of the light beam and being rotatable about an axis of rotation such that the origins of the apertures are coincident with said optical axis upon positioning of said apertures into said light beam through rotation of said masking plate; and at least one masking member extending from the origin to the perimeter of at least one of said apertures, the masking member having a masking surface with a masking area continuously increasing in magnitude with increasing radial distance from the origin, such that said radial distribution of light is maintained and such that the uniformity of light exiting said single optical fiber is maximized at all levels of attenuation.

2. The optical system of claim 1, wherein the masking surface of the masking member has a cross-sectional shape with respect to the optical axis of the light beam with curvilinear edges extending from the origin to the perimeter of the aperture.

3. The optical system of claim 1, wherein the masking surface of the masking member has a cross-sectional shape with respect to the optical axis of the light beam selected from the group consisting of a triangular shape, a sectorial shape, a parabolic shape, a hyperbolic shape and a cycloidal shape.

4. The optical system of claim 1, wherein a plurality of masking members extend from the origin to the perimeter of the aperture, each masking member having a masking surface with a masking area continuously increasing in magnitude with increasing radial distance form the origin.

5. The optical system of claim 4, wherein the masking members are arranged in the aperture with geometric symmetry about the origin of the aperture.

6. The optical system of claim 4, wherein the plurality of masking members are arranged in pairs in the aperture, each pair having a first masking member disposed opposite to a second masking member with respect to the origin of the aperture, each pair of masking members being angularly separated from each other pair of masking members by an equal predetermined angular extent.

7. The optical system of claim 1, wherein the masking plate forms a disc having a pivot axis and the apertures are formed in an arcuate area extending along a periphery of the disc with the origin of each aperture disposed on an arcuate movement path of intersection between the optical axis of the light beam and the disc as the disc rotates about the pivot axis.

8. The optical system of claim 1, wherein the light beam is a conical beam and the spot image formed at the masking plate has a radius having a length not greater than a greatest radial length of the aperture.

9. The optical system of claim 1, wherein the light beam includes light selected from the group consisting of coherent light, incoherent light and monochromatic light.

10. A light intensity attenuator for adjusting the quantity of radiant energy in a light beam output from an optical transmission system, the light beam having a cross-section perpendicular to an optical axis of the light beam defining a spot having a center point coincident with the optical axis of the light beam, said spot having a radial distribution of light intensity from said center point, the attenuator comprising:
   a disc-like masking plate inserted into the light beam substantially perpendicular to the optical axis of the light beam, the masking plate having a pivot axis and a plurality of apertures extending along a periphery of the masking plate;
   each aperture having an origin disposed substantially in a center of the aperture and a radius with a radial length extending from the origin to a perimeter of the aperture, the origin of each aperture being disposed on an arcuate movement path of intersection between the optical axis of the light beam and the masking plate as the masking plate rotates about the pivot axis; and
   at least two masking members extending from the origin to the perimeter of at least one aperture, each masking member having a masking surface with a masking area continuously increasing in magnitude with increasing radial length distance from the origin; with
   said at least two masking members being arranged as a pair in said at least one aperture, said pair having a first masking member disposed opposite to a second masking member with respect to the origin of said at least one aperture, such that the radial distribution of light is maintained.

11. The attenuator of claim 10, wherein the masking surface of the masking members has a cross-sectional shape with respect to the optical axis of the light beam with curvilinear edges extending outward from the origin to the perimeter of the aperture.

12. The attenuator of claim 10, wherein the masking surface of the masking members has a cross-sectional shape with respect to the optical axis of the light beam selected from the group consisting of a triangular shape, a sectorial shape, a parabolic shape, a hyperbolic shape and a cycloidal shape.

13. The attenuator of claim 10, wherein at least two masking members extend from the origin of a plurality of apertures, and the masking members of different apertures have different masking areas per unit radial distance from the origin of the respective apertures with each aperture providing a different, discrete level of attenuation of the radiant energy in the light beam as the masking plate is rotated about the pivot axis.

14. The attenuator of claim 10, wherein the light beam is a conical beam and the spot formed at the masking plate has a radius having a length not greater than the radial length of any of said plurality of apertures.

15. The attenuator of claim 10, wherein the light beam is selected from the group consisting of coherent light, incoherent light and monochromatic light.

16. An optical system comprising:
   a light source for providing a light beam having an optical axis and having a redial distribution of light intensity from said optical axis;
   an optical fiber means for receiving the light beam; and
   means for attenuating said light beam, positioned between the light source and the optical fiber means, said means for attenuating comprising a plate having a plurality of apertures, at least one of said apertures having at least one light blocking member covering the optical axis of the beam and extending to an outer periphery of the beam, said member having an increasing width taken from the optical axis to the outer periphery, such that the radial distribution of light is maintained and such that the uniformity of light exiting said optical fiber means is maximized at all levels of attenuation.

17. The optical system of claim 16 wherein at least one aperture is provided which does not include a blocking member.

18. The optical system of claim 16 wherein the optical fiber means comprises a single fiber optic.

19. An optical system, comprising:
   a light source for providing a light beam having an optical axis and a radial distribution of light intensity from said optical axis;
   an optical fiber means for receiving the light beam; and
   a light intensity attenuator for attenuating a quantity of radiant energy in the light beam, said attenuator including
   at least one pair of masking members disposed in said light beam, each masking member having a masking surface with a masking area continuously increasing in magnitude with increasing radial length distance from the optical axis, a first masking member of said pair being disposed opposite to a second masking member of said pair with respect to the optical axis of the light beam, such that the radial distribution of light is maintained at the exit of the light beam from the optical fiber means.

20. A light intensity attenuator for adjusting a quantity of radiant energy in a light beam provided by a light source, the light beam having an optical axis and a radial distribution of light intensity from said optical axis, the attenuator including
   a plurality of masking members disposed in the light beam, each masking member extending from said optical axis to an outer periphery of the light beam and having a masking area that continuously increases in magnitude with increasing radial distance from said optical axis, the plurality of masking members being arranged in pairs, each pair having a first masking member disposed opposite to a second masking member with respect to the optical axis,
   each pair of masking members being pivotable about the optical axis to permit variable overlapping of masking areas of different pairs of masking members for variable adjustment of a total masking surface for said light beam, wherein said total masking surface provides a total masking area which extends on opposite sides with respect to said optical axis, and continuously increases in magnitude on each of said opposite sides with increasing radial distance from said optical axis.

* * * * *